US008230436B2

(12) United States Patent
Tran et al.

(10) Patent No.: US 8,230,436 B2
(45) Date of Patent: Jul. 24, 2012

(54) AGGREGATING RECURRENT SCHEDULES TO OPTIMIZE RESOURCE CONSUMPTION

(75) Inventors: Anh P. Tran, Seattle, WA (US); Lloyd Alfred Moore, Renton, WA (US); Christopher Todd Guillory, Kirkland, WA (US); Hugh Teegan, Bellevue, WA (US); John Mark Miller, Kirkland, WA (US); Adam Sapek, Redmond, WA (US); Keith C. Bentley, Redmond, WA (US); Poonam Ganesh Hattangady, Seattle, WA (US); Albert Liu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1086 days.

(21) Appl. No.: 12/056,287

(22) Filed: Mar. 27, 2008

(65) Prior Publication Data

US 2009/0183157 A1 Jul. 16, 2009

Related U.S. Application Data

(63) Continuation-in-part of application No. 11/971,909, filed on Jan. 10, 2008.

(51) Int. Cl.
*G06F 9/46* (2006.01)
*G06F 15/173* (2006.01)

(52) U.S. Cl. ........ 718/104; 718/100; 718/102; 718/103; 718/105; 709/225; 709/226

(58) Field of Classification Search .................. 718/100, 718/102, 103, 104; 709/225, 226
See application file for complete search history.

(56) References Cited

U.S. PATENT DOCUMENTS

| 5,369,798 | A | 11/1994 | Lee |
| 5,692,125 | A | 11/1997 | Schloss et al. |
| 5,867,657 | A | 2/1999 | Bolosky et al. |
| 6,112,061 | A | 8/2000 | Rapeli |
| 6,901,592 | B2 | 5/2005 | Mar et al. |
| 7,099,689 | B2 | 8/2006 | Bahl et al. |
| 7,130,313 | B2 | 10/2006 | Pekonen |
| 7,137,099 | B2 | 11/2006 | Knight et al. |
| 7,433,714 | B2 | 10/2008 | Howard et al. |
| 2002/0016729 | A1 | 2/2002 | Breitenbach et al. |
| 2002/0198616 | A1* | 12/2002 | Crampton et al. ............... 700/99 |
| 2003/0105809 | A1 | 6/2003 | Yoshii et al. |
| 2003/0135643 | A1 | 7/2003 | Chiu et al. |
| 2003/0149809 | A1 | 8/2003 | Jensen et al. |
| 2004/0002943 | A1* | 1/2004 | Merrill et al. ..................... 707/1 |
| 2004/0063442 | A1 | 4/2004 | Goldberg |
| 2004/0103411 | A1 | 5/2004 | Thayer |
| 2004/0109436 | A1 | 6/2004 | Vargas et al. |
| 2004/0196866 | A1 | 10/2004 | Park et al. |
| 2004/0216098 | A1 | 10/2004 | Roe et al. |
| 2004/0225525 | A1 | 11/2004 | Weitzman |

(Continued)

OTHER PUBLICATIONS

Jeffay, "Scheduling Sporadic Tasks with Shared Resources in Hard-Real-Time Systems", Proceedings of the 13th IEEE Real-Time Systems Symposium, Phoenix, AZ, Dec. 1992, pp. 89-99.

(Continued)

*Primary Examiner* — Emerson Puente
*Assistant Examiner* — Willy W Huaracha

(57) ABSTRACT

Coalescing schedules that use a resource to extend battery life. Each of the schedules is defined to execute at a recurrent activation time within a defined tolerance. After receiving notification of an event, the schedules are accessed to identify the schedules that may be executed early based on their activation time and tolerance. The identified schedules are aggregated for execution.

19 Claims, 4 Drawing Sheets

U.S. PATENT DOCUMENTS

| | | | |
|---|---|---|---|
| 2005/0043020 A1 | 2/2005 | Lipsanen et al. | |
| 2005/0108715 A1 | 5/2005 | Kanai et al. | |
| 2005/0125796 A1* | 6/2005 | Vargas et al. | 718/100 |
| 2006/0068832 A1 | 3/2006 | Islam et al. | |
| 2006/0094400 A1* | 5/2006 | Beachem et al. | 455/410 |
| 2006/0259908 A1 | 11/2006 | Bayer | |
| 2007/0058605 A1 | 3/2007 | Meylan et al. | |
| 2007/0070940 A1 | 3/2007 | Vander Veen et al. | |
| 2007/0093935 A1 | 4/2007 | Fu | |
| 2007/0097867 A1 | 5/2007 | Kneckt et al. | |
| 2007/0118530 A1* | 5/2007 | Chow et al. | 707/10 |
| 2007/0118590 A1 | 5/2007 | Giacalone, Jr. | |
| 2007/0149186 A1 | 6/2007 | Barbosa et al. | |
| 2007/0177558 A1 | 8/2007 | Ayachitula et al. | |
| 2007/0198698 A1 | 8/2007 | Boyd et al. | |
| 2007/0259699 A1 | 11/2007 | Homchaudhuri | |
| 2008/0025378 A1 | 1/2008 | Mahany et al. | |
| 2008/0113656 A1 | 5/2008 | Lee et al. | |
| 2008/0130541 A1 | 6/2008 | Kokku et al. | |
| 2008/0215407 A1 | 9/2008 | Pachon et al. | |
| 2009/0182608 A1 | 7/2009 | Tran et al. | |
| 2009/0183157 A1 | 7/2009 | Tran et al. | |
| 2009/0307519 A1 | 12/2009 | Hyatt | |
| 2010/0195584 A1 | 8/2010 | Wilhelmsson et al. | |

OTHER PUBLICATIONS

Bhulai, et al., "Scheduling Time-Constrained Jobs in the Presence of Background Traffic", Proceedings of the 39th IEEE. Conference on Decision and Control, vol. 2, Dec. 2000, pp. 1421-1426.

Jeffay, et al., "Rate-Based Resource Allocation Models for Embedded Systems", Lecture Notes in Computer Science; vol. 2211, Proceedings of the First International Workshop on Embedded Software, Year of Publication: 2001, pp. 204-222.

Yun, et al., "Event-Based Scheduling Algorithm for Rendering SMIL Documents", Fifth IEE International Conference on 3G Mobile Communication Technologies, 2004. 3G 2004, Publication Date: 2004, pp. 509-513.

Final Office action mailed from the USPTO in U.S. Appl. No. 12/147,774, U.S., Oct. 15, 2010, pp. 23.

Advisory Action mailed from the USPTO in U.S. Appl. No. 12/056,287, U.S., Dec. 30, 2010, pp. 2.

International Search Report and Written Opinion of International Application No. PCT/US2009/058166, dated Apr. 23, 2010, 10 pages.

"Non-final Office Action", Dated Apr. 15, 2011, U.S. Appl. No. 12/147,774, pp. 13.

"Advisory Action", Dated Dec. 30, 2010, U.S. Appl. No. 12/147,774, pp. 2.

Shih, et al., "Wake on Wireless: An Event Driven Energy Saving Strategy for Battery Operated Devices", International Conference on Mobile Computing and Networking, Proceedings of the 8th annual international conference on Mobile computing and networking, Atlanta, Georgia, USA, Year of Publication: 2002, pp. 160-171.

Bahl, et al., "Reconsidering Wireless Systems with Multiple Radios", ACM SIGCOMM Computer Communication Review, vol. 34, Issue 5 (Oct. 2004), Session: Perspective Papers, Year of Publication: 2004, pp. 39-46.

Chlamtac, et al., "Energy Conservation in Access Protocols for Mobile Computing and Communication", Microprocessors and Microsystems Journal (1998), pp. 1-11.

Rhee, et al., "Techniques for Minimizing Power Consumption in Low Data-Rate Wireless Sensor Networks", In Proc. IEEE Wireless Communications and Networking Conference (WCNC 2004), Mar. 2004, pp. 1-5.

"Pocket Power Manager 1.0", http://www.filedudes.com/Pocket_Power_Manager-download-47203.html.

Kravets, et al., "Application Driven Power Management for Mobile Communication", Retrieved at << www-sal.cs.uiuc.edu/~rhk/pubs/winet98.ps >>, Wireless Networks, vol. 06, No. 4, Jul. 2000, pp. 1-20.

Pal, at el., "Improving Delivery Time Guarantees for Wireless Data Services", Retrieved at << http://ieeexplore.ieee.org/iel5/9178/29117/01311488.pdf?arnumber=1311488 >>, IEEE Wireless Communications and Networking Conference, WCNC, Mar. 21-25, 2004, pp. 2539-2544.

Zaharia, at el., "Fast and Optimal Scheduling over Multiple Network Interfaces", Retrieved at << http://www.acm.org/src/Matei/matei.html >>, 2007, pp. 16.

Pering, at el., "CoolSpots: Reducing the Power Consumption of Wireless Mobile Devices with Multiple Radio Interfaces", Retrieved at << https://www.usenix.org/events/mobisys06/full_papers/p220-pering.pdf >>, The 4th International Conference on Mobile Systems, Applications and Services, Jun. 19-22, 2006, pp. 220-232.

Flinn, Jason., "Managing Battery Lifetime with Energy-Aware Adaptation", Retrieved at << http://www.cs.cmu.edu/~satya/docdir/p137-flinn.pdf >>, ACM Transactions on Computer Systems, vol. 22, No. 2, May 2004, pp. 137-179.

Pering, at el., "Exploiting Radio Hierarchies for Power-Efficient Wireless Device Discovery and Connection Setup", Retrieved at << http://ieeexplore.ieee.org/iel5/9501/30140/01383368.pdf?tp=&isnumber=&arnumber=1383368 >>, 18th International Conference on VLSI Design held jointly with 4th International Conference on Embedded Systems Design (VLSID'05), India, Jan. 2007, pp. 6.

"Non-final Office action mailed from the USPTO in U.S.", U.S. Appl. No. 12/147,774, U.S., May 14, 2010, pp. 11.

"Final Office action mailed from the USPTO in U.S.", U.S. Appl. No. 12/147,744, U.S., Oct. 15, 2010, pp. 23.

Non-final Office action mailed from USPTO in U.S, Oct. 6, 2011, U.S. Appl. No. 12/051,849, pp. 21.

First Office action mailed from IPO in PR China Jan. 11, 2012, Application 200980111814.X, pp. 7.

* cited by examiner

AGGREGATING RECURRENT SCHEDULES TO OPTIMIZE RESOURCE CONSUMPTION

CROSS-REFERENCE TO RELATED APPLICATION

This application is a continuation-in-part of commonly-owned, co-pending U.S. patent application Ser. No. 11/971,909, filed Jan. 10, 2008, the entire disclosure of which is hereby incorporated by reference herein for all purposes.

BACKGROUND

Mobile computing devices, such as mobile phones and personal digital assistants (PDA), have become increasingly popular in recent years. As the devices continue to get smaller, there are increasing limitations in resources such as memory, storage, bandwidth, and battery. Additionally, more applications now require increasing levels of such resources. For example, many applications execute recurring tasks such as synchronization with a server and real-time content updates that require frequent radio usage to persist connections. After the radio powers on to send data, the radio takes several seconds to power off (e.g., about 3 seconds on 2.5G networks and about 20 seconds on 3G networks). This radio "tail" absorbs power and diminishes device battery life.

SUMMARY

Embodiments of the invention adjust activation times of recurrent schedules to take opportunistic advantage of resources such as constrained resources. Each schedule is defined to activate at a recurrent activation time but can be executed early, within a tolerance factor. After a notification of an event such as resource availability is received, schedules are identified based on the received notification, the activation time, and the tolerance factor. For example, some schedules will be identified for early activation based on the tolerance factor to make use of the available resource. The identified schedules are aggregated and activated.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the invention provide a scheduler service 202 executing on a computing device 204 that controls activation of recurrent schedules 208. The schedules 208 are defined to occur periodically by a user or by one or more application programs 207 such as application program #1 through application program #M.

Figure 1:
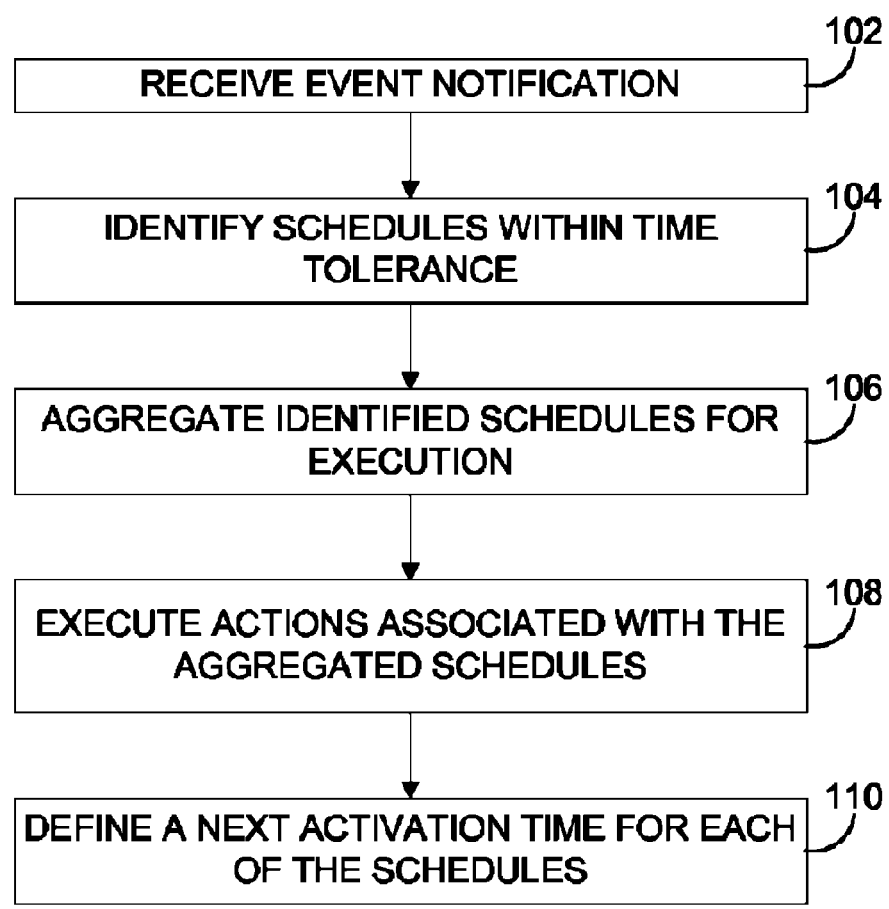
FIG. 1 is an exemplary flow chart illustrating operation of a scheduler service.

Activation of the schedules 208 includes performing or executing one or more actions 406 associated with the schedules 208 at a defined activation time 410 within a predefined tolerance. Exemplary operation of the scheduler service 202 is shown in FIG. 1. At 102, an event notification is received. For example, the notification indicates that a constrained resource is available. The plurality of schedules 208 is accessed at 104. Each of the plurality of schedules 208 has the defined activation time 410 and a tolerance factor 412 among other properties (e.g., rules for schedule expiration, maximum schedule run count, whether the schedule 208 requires use of the constrained resource, etc.). The tolerance factor 412 generally indicates the tolerance of the schedule 208 to run early when the constrained resource becomes available. The tolerance factor 412 includes any means for indicating the availability of the schedule to execute at a time that differs from its predefined activation time 410. For example, the tolerance factor 412 includes, but is not limited to, a constant value (e.g., in minutes or seconds), a percentage (e.g., a percentage of an interval duration 408 such as 10%), and a rolling average of the minutes between resource availability.

At 106, one or more of the accessed schedules are identified as a function of the event notification, a current time, the defined activation time 410, and the tolerance factor 412 of each of the accessed schedules. For example, the scheduler service 202 identifies the schedules 208 for which the event is a defined condition for activation of the schedules 208, or otherwise identifies the schedules 208 to which the event applies. The scheduler service 202 further selects, from the identified schedules, those schedules that may be activated early based on the tolerance factor 412 for each of the schedules. For example, the scheduler service 202 calculates a difference between the current time and the defined activation time 410 for each of the schedules 208 and compares the calculated difference to the tolerance factor 412 for the schedules 208. For all differences that are within tolerance, the corresponding schedules are selected for activation.

In an example of element 106, the schedules 208 that require the constrained resource are evaluated for eligibility to run at the time the notification is generated or received. In some embodiments, eligibility is determined based on whether the current time falls between the scheduled time and the scheduled time less the tolerance to run early.

The identified schedules are activated at 108. Activation of the identified schedules includes executing one or more of the actions 406 associated with the schedules. The actions 406 include, for example, a software configuration action such as software installation, configuration, and/or update. The action may also include accessing an executable file or library on the computing device 204. The action may also include modification of a synchronization event on computing device 204 that would then result in any of the previous actions occurring.

For a mobile computing device 302, one of the most constrained resources is the battery and the usage of the cellular radio is the most power draining activity on the mobile computing device 302.

In an embodiment in which the scheduler service 202 executes on or otherwise controls the mobile computing device 302, operation of the scheduler service 202 extends battery life by coalescing, combining, or otherwise aggregating recurrent schedules 208 to optimize use of the available resources. The recurrent schedules 208 are selected based on the event. The event includes any condition such as a particular time or a device condition. For example, if the event indicates that a resource is available (e.g., a network or network type), identifying the schedules 208 includes identifying the schedules 208 that use the resource. In another example, schedules 208 that require the cellular radio will be identified for early activation based on the tolerance factor 412 to make use of the radio while it is already powered up for another task. Appendix A lists further exemplary schedules 208 that are within the scope of embodiments of the invention.

By varying the activation time 410 of each schedule within the tolerance, the scheduler service 202 operates to extend battery life by taking advantage of resources while the resources are available and by minimizing overhead. For example, when there is an asynchronous cellular, wireless-fidelity (Wi-Fi), or other radio transmitter or receiver event (e.g., a server sends the device data or the user initiates a web browsing session), the scheduler service 202 scans a database 210 and determines schedules that can piggyback or leverage the radio usage. Aggregating schedules in this manner minimizes radio spin ups. In other embodiments, the scheduler service 202 operates to minimize the frequency of bringing the device out of an idle state. In another example, the scheduler service 202 operates to conserve power-consuming resources such as the following components of a mobile computing device 302: a backlight, a processor, an audio amplifier, a global positioning system, a digital memory ready, a short-range wireless network adapter (e.g., for a BLUETOOTH brand network), an auxiliary processor, a vibration motor, a ringer, a camera, an accelerometer, and an ambient light sensor.

Alternatively or in addition, if the scheduler service 202 determines that a resource will not be placed into a high consumption state during separate execution of the schedules, the scheduler service 202 will execute the schedules separately.

While described in some embodiments with reference to the mobile computing device 302, aspects of the invention are applicable other devices. Further, while described in some embodiments with reference to the scheduler service 202, aspects of the invention are applicable to any component performing the functionality illustrated and described herein.

In an example in which Schedules A, B, and C all require a network connection, Schedules B & C can be batched or aggregated with Schedule A based on the tolerance factor 412. If the execution of Schedule A spins up a radio event, that event will be published and then Schedules B & C are executed to take advantage of the radio event. If it turns out that Schedule A never needed a network, then Schedules B and C will execute at their original scheduled time.

After execution of the schedules, the scheduler service 202 defines the next activation time for each of the schedules at 110. Each of the schedules 208 has the interval duration 408 corresponding to the time between recurrent activations of each of the schedules 208. The interval duration 408 is set by the application program 207 or user when creating the schedule. In an embodiment, the next activation time for each of the schedules is determined by adding the interval duration 408 to the last activation time. As such, the actual time periods between schedule executions may be shorter than the interval duration 408 but will never be longer than the interval duration 408.

Alternatively, the next activation time for each of the schedules is set based on the originally defined activation time. As such, the actual periods between schedule executions may be either shorter or longer than the interval duration 408 but the long-term average interval duration converges to the specified interval. In an embodiment, the application program 207 or user creating the schedules 208 determines which method of setting the next activation time should be used.

In some embodiments, many of the application programs 207 have schedules 208 to regularly send small data packets to servers to keep a connection open. Open connections allow servers to push data to the mobile computing devices 302 in real-time. The scheduler service 202 allows the application programs 207 to call an application programming interface (API) and simulate that the schedule 208 was run. As a result, the next scheduled time is calculated based on the simulated run. In such an example, the recurrent schedules 208 are known as "heartbeats" and ensure that data is sent between the computing device 204 and the server under the network timeout. For example, if the network timeout is 15 minutes, the connection requires that some data is exchanged between the device and server every 15 minutes or the connection will close. That is, the device 204 must send some small data packets to the server every 15 minutes. However, if the server sends the device data (e.g., at the 8 minute mark), the application program 207 calls the API call at the 8 minute mark. The next activation time for the schedule is calculated to be at the 23 minute mark (e.g., 8+15) instead of the 15 minute mark.

Appendix B includes a list of exemplary properties and states for the scheduler service 202.

Figure 2:
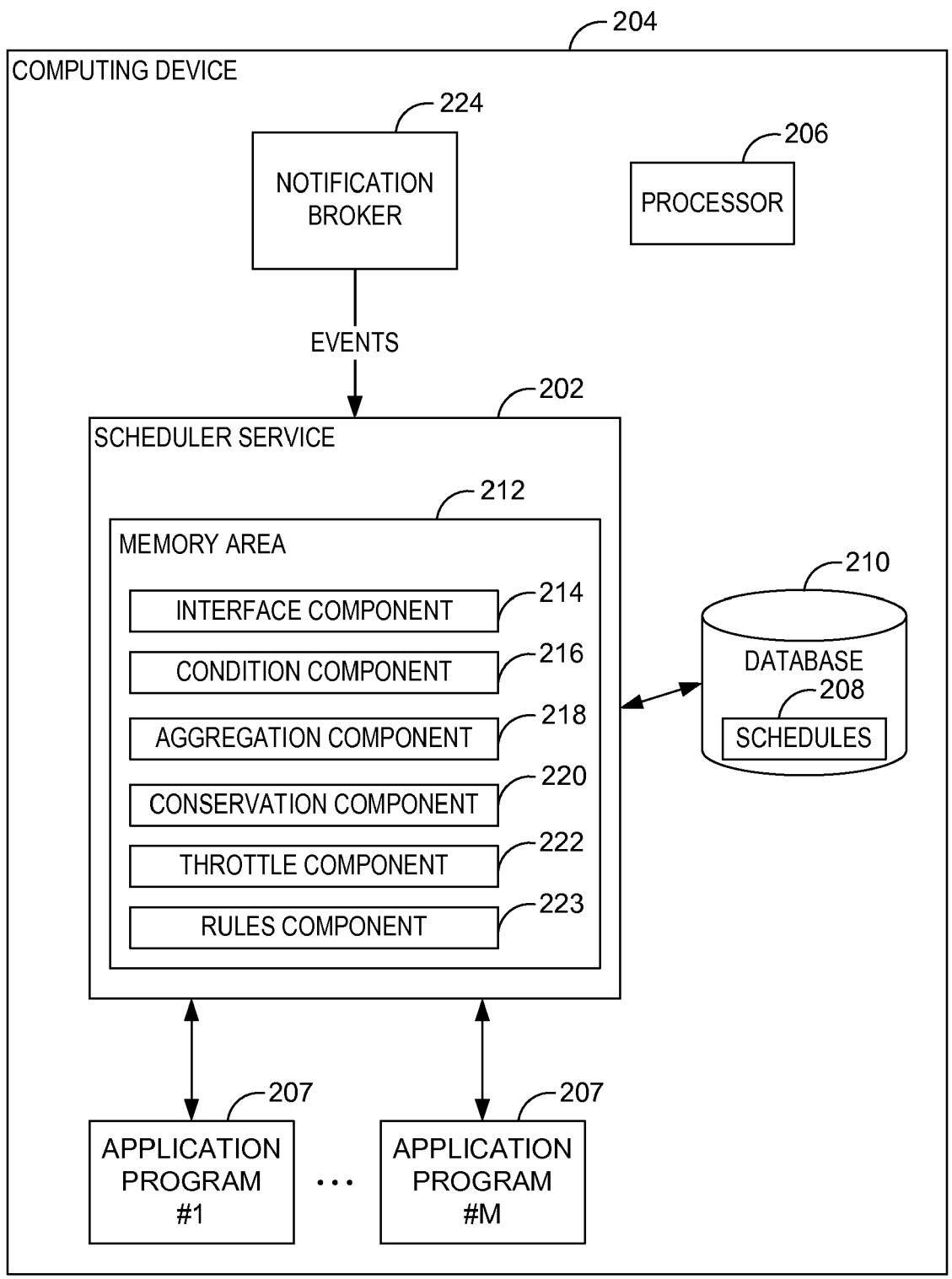
FIG. 2 is an exemplary block diagram illustrating the scheduler service executing on a computing device.

Referring to FIG. 2, an exemplary block diagram illustrates the scheduler service 202 executing on the computing device 204. The computing device 204 includes, for example, a mobile device such as a personal digital assistant (PDA) or a mobile telephone. A processor 206 is configured to execute computer-executable instructions for receiving the activation time 410, the tolerance factor 412, and the interval duration 408 for each of the schedules 208 from the user, the application program 207 executing on the computing device 204, the application program 207 executing remotely from the computing device 204, or another source. The received schedule data is stored in the database 210 or other memory area. Appendix C lists exemplary properties and definitions involved in defining the schedules 208.

The interval duration 408 determines the time period between executions or activations of the schedules 208. Successive interval durations may be the same, or be related linearly, exponentially, or the like. For example, some of the schedules 208 have progressively increasing intervals between activations. In an embodiment, the application program 207 or the user specifies one or more of an initial interval value, a type of progression (e.g., linear or exponential), and a maximum interval value. When the schedules execute, the interval starts from the initial value and then increases appropriately after each execution. If the maximum interval value is specified, the interval duration 408 never increases above the maximum interval value but remains at its highest value.

One or more computer-readable media have computer-executable components for implementing embodiments of the scheduler service 202. For example, the components are stored on a memory area 212 and include an interface component 214, a condition component 216, an aggregation component 218, a conservation component 220, a throttle component 222, and a rules component 223. The interface component 214 receives notification of an event (e.g., notice of availability of a power-consuming resource on the computing device 204). For example, the event may be a time event such as the occurrence of a relative time interval (e.g., 5 minutes after boot up) or an absolute time (e.g., 12:00:00 am). The event may also be a state event, such as boot up, detecting a predetermined connection type such as a Wi-Fi connection or a cellular connection, and/or reestablishing network connection after initially losing network connectivity, or other state of the computing device 204. Further, the event notifications are received from a notification broker 224 or any other eventing, notification, or state system. While the notification broker 224 in FIG. 2 is shown as executing on the computing device 204, the notification broker 224 alternatively or in addition executes on another computing device (e.g., communicating with the computing device 204 via a network).

In an example, there are several ways for the interface component 214 to receive notification that a cellular radio is transmitting data on the mobile computing device 302. One way involves the radio manufacturer informing the software layer above the radio that the radio is transmitting data. Another way is to monitor the internet protocol (IP) stack for data that is sent or received. When data is transmitted or received, the time is recorded and an event state is set (e.g., to "true"). After a defined time period (e.g., ten seconds), the event state is changed (e.g., to "false") if no other data has been transmitted. The scheduler service 202 coalesces schedules 208 upon detecting that the state of the event goes from "false" to "true" in this example indicating that the radio is transmitting data.

Based on the event information received by the interface component 214, the condition component 216 identifies at least one of the schedules 208 stored in the database 210. In an example in which the received event indicates availability of a resource, the condition component 216 identifies the schedules 208 that consume the resource during execution. The aggregation component 218 selects one or more of the schedules identified by the condition component 216 for execution based on the activation time 410 and the tolerance factor 412 for the schedules. For example, the aggregation component 218 selects those schedules for which a difference between the next activation time and the time of receipt of the notification by the interface component 214 is within the tolerance factor 412 for the schedule. In an embodiment, the time of receipt of the notification corresponds to a current time. The conservation component 220 executes the schedules selected by the aggregation component 218. For example, the conservation component 220 executes the actions 406 associated with each of the aggregated schedules. As an example, the criteria for selecting the schedules by the aggregation component 218 are represented by the following Boolean expression: (Current Time>=(NEXT_RUN_TIME−RUN_EARLY_ TIME)) and (Current Time<END_TIME). All schedules that meet these criteria are selected by the aggregation component 218.

The throttle component 222 limits the quantity of schedules executed by the conservation component 220 as a function of a predefined throttle limit value. In an embodiment, the throttling limit is defined as a function of a consumption state of a resource on the computing device 204. For example, before the conservation component 220 executes the schedules selected by the aggregation component 218, the conservation component 220 determines via the throttle component 222 whether the throttle limit threshold has been reached. For example, a large number of schedules or actions triggered in close temporal proximity may result in acute resource starvation. To mitigate this condition, the throttle component 222 launches only a defined quantity of schedules or actions 406 during any given time window. Each time a schedule or action is successfully launched, a counter increments. If the counter value reaches the throttle limit, further launches of schedules or actions are delayed until the counter resets to zero or otherwise decreases. For example, the counter resets to zero by a thread executing at regular, predefined intervals. Alternatively or in addition, the counter decrements when a schedule or action using the resource releases the resource.

The rules component 223 applies schedule-specific properties to each of the schedules 208. For example, the rules component 223 determines how the next scheduled time is calculated (e.g., maximum or average), when to start the schedule 208, when to end the schedule 208, how many times to repeat the schedule 208, and what entities may modify the schedule 208.

Some of schedules 208 are defined to execute only when the computing device 204 boots. If these schedules share a common resource (e.g., the radio), the scheduler service 202 aligns the activation of these schedules to a common activation time to take advantage of the availability of the resource.

Similarly, the scheduler service 202 aligns schedules with similar intervals or multiples of intervals to a base time zero (e.g., an artificial time zero). As an example, two application programs 207 have five minute heartbeat intervals each with a 20% tolerance factor 412 (e.g., which corresponds to one minute of tolerance for running early). The first application performs heartbeat operations at time T0 (e.g., startup), T5 (e.g., five minutes after startup), and T10 (e.g., ten minutes after startup). The second application starts up and performs a heartbeat operation at time T2 (e.g., two minutes after the first application started up) and T7 (e.g., five minutes after startup). Because the difference between the heartbeat operations for the applications is either two or three minutes, the heartbeats operations are not coalesced by the scheduler service 202. Rather, the scheduler service 202 aligns the second application to startup at time T5 so that the heartbeat operations for both applications occur at the same time.

Figure 3:
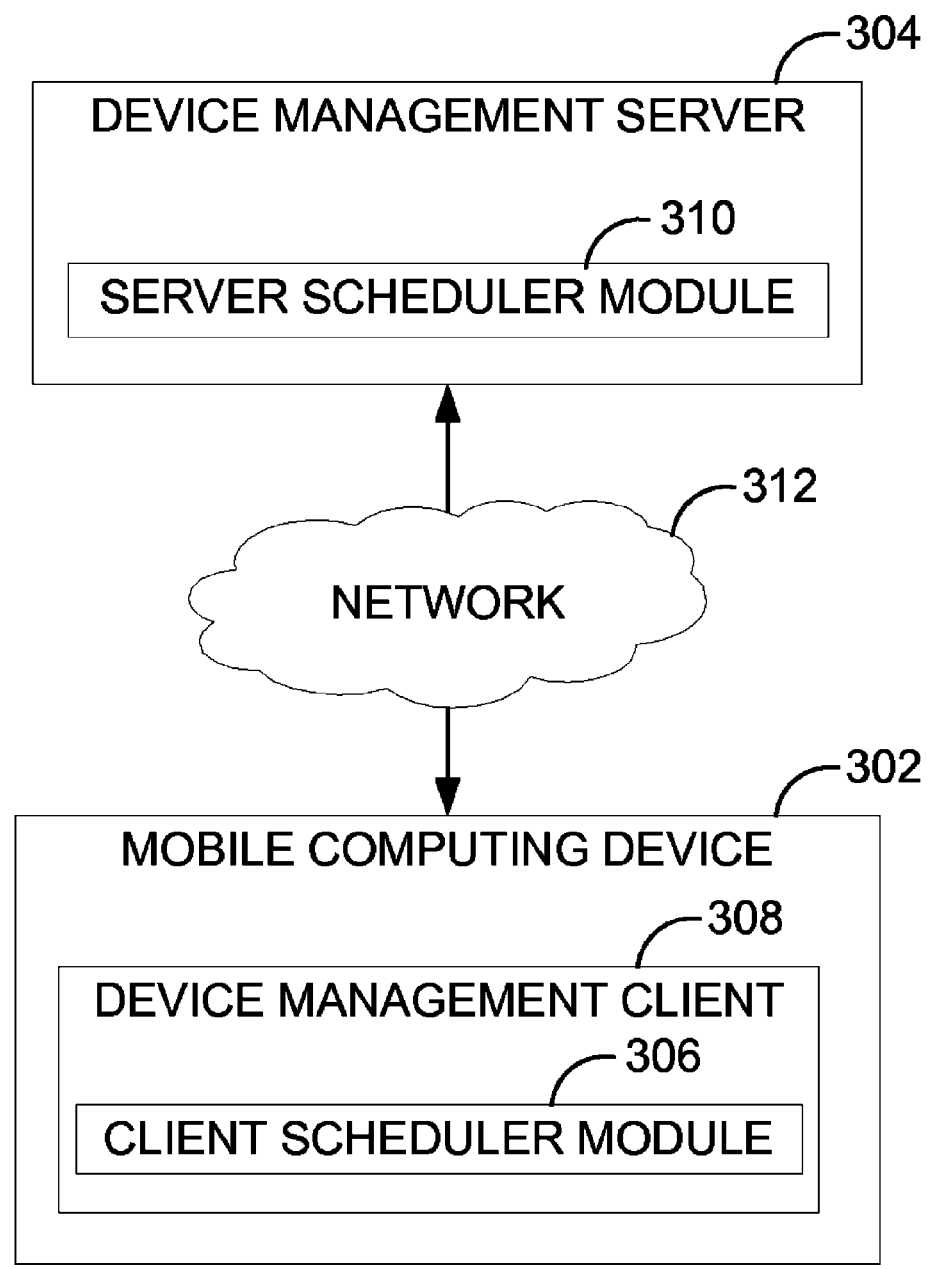
FIG. 3 is an exemplary block diagram illustrating control of a mobile computing device by a device management server.

Referring to FIG. 3, an exemplary block diagram illustrates control of the mobile computing device 302 by a device management server 304. In FIG. 3, the scheduler service 202 from FIG. 2 acts as a client scheduler module 306 executing within a device management client 308 communicating with a server scheduler module 310 executing on the device management server 304 or other computing device (e.g., connected via a network 312). In such embodiments, the server scheduler module 310 instructs the client scheduler module 306 to activate the scheduled 208 and to perform the execution of the actions 406 associated with each of the aggregated schedules as in FIG. 2.

Figure 4:
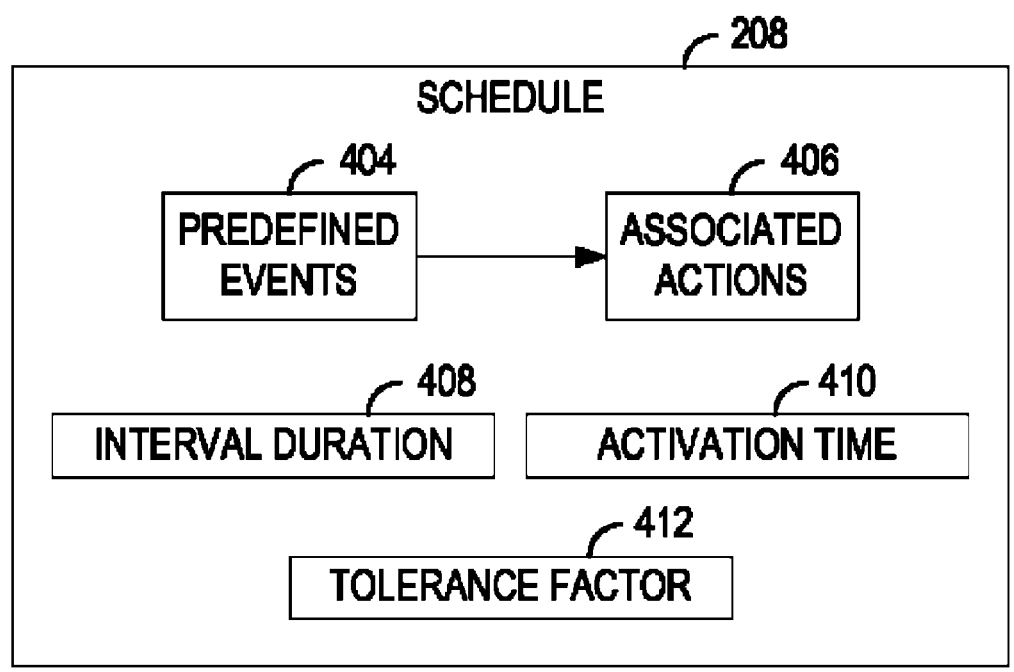
FIG. 4 is an exemplary block diagram illustrating a data structure representing a schedule.

Referring to FIG. 4, an exemplary block diagram illustrates a data structure representing the schedules 208. The schedules 208 are stored in a data structure that may be encoded in an extensible markup language (XML) format. Each of the schedules 208 include a list of predefined events 404 and the associated actions 406, along with the interval duration 408, the activation time 410, and the tolerance factor 412. The predefined events 404 include time events and state events. The associated actions 406 include operations to be performed when the predefined events 404 occur. The actions 406 specify, for example, an executable file path and command line parameters or named synchronization event.

Exemplary Operating Environment

A computing device or computer such as described herein has one or more processors or processing units and a system memory. The computer typically has at least some form of computer readable media comprising computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations.

Embodiments of the invention may be described in the general context of computer-executable instructions, such as program modules, executed by one or more computers or other devices. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The embodiments illustrated and described herein as well as embodiments not specifically described herein but within the scope of aspects of the invention constitute exemplary means for aggregating the recurrent schedules 208 for activation, exemplary means for aligning activation of the recurrent schedules 208, and exemplary means for identifying one or more of the plurality of recurrent schedules 208 as a function of the received notification, the notification time, the defined activation time, and the tolerance factor 412 of each of the plurality of recurrent schedules.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Appendix A

Listed below are sample schedules within the scope of embodiments of the invention.

In another example, an application has a schedule that executes at noon and uses the radio in a mobile device. Another application has a schedule with a defined activation time 410 of 12:05 pm along with a tolerance of five minutes. This schedule also requires use of the radio. The scheduler service then aggregates the two schedules to activate at the same time thereby allowing the radio to spin up only once. The result is battery savings by avoiding the power absorption required for the radio to power down (e.g., the radio powers down once instead of twice). In variations of this example, after running early, the schedule's next execution time is recalculated so that it never exceeds the interval duration value or the next execution time is never recalculated.

In another example, an application monitors an on-line data source, such as an auction, which has a predefined end time. The desired schedule update rate is variable, and the desire is to update more frequently as the end time approaches.

In another example, an application on the device must send data to the server every x minutes in order to keep the connection open between the device and the server. If the server sends data before the next scheduled time, the device application does not need to send data at that scheduled time, it only needs to recalculate the next scheduled time to equal the time data is received from server+x.

Appendix B

Listed below are exemplary properties and states for a scheduler according to embodiments of the invention.

TABLE B1

Global State.

| Name | Description |
|---|---|
| CURRENT_TIME | represents the value of the system clock in UTC |
| SERVICE_START_TIME | represents the value of the system clock in UTC, when the Service Started |
| SERVICE_START_TICK | represents the value of the Tick count when the service started |
| SCHEDULES | List of all schedules in the system. |
| AGGREGATION_ENABLED | Enable or disable the aggregation function |

TABLE B2

State per Schedule.

| Name | Description |
|---|---|
| CURRENT_INTERVAL | Defines the interval which is used to compute NEXT_RUN_TIME. This gets reset to initial value upon service start or when the schedule becomes active. |
| CURRENT_RUN_COUNT | Count which keeps track of number of times the schedule has fired. |
| NEXT_RUN_TIME | Time at which the next scheduled firing is supposed to happen. −1 if the schedule was never scheduled to fire. |
| ENABLED | If enabled, the schedule could be eligible to be active. |

TABLE B3

State per Group.

| Name | Description |
|---|---|
| GROUP_LAST_ACTUAL_RUN_TIME | Time at which last firing of a schedule among its schedules occurred. −1 If no schedule fired in this group then. |

TABLE B3-continued

State per Group.

| Name | Description |
|---|---|
| GROUP_LAST_SCHEDULED_RUN_TIME | Most recent time at which a schedule among its schedules was scheduled to fire. −1, if no schedule was scheduled earlier. |
| ACTIVE_SCHEDULE | Is the active schedule in the group |

TABLE B4

Global Properties.

| Name | Description |
|---|---|
| FUZZ_THROTTLING_LIMIT | For every adjustable event, this is the maximum number of schedules which can be aggregated together. This is used for Throttling. |
| STARTUP_THROTTLING_LIMIT | Upon service startup, if there are multiple schedules which need execution, then this setting is used to throttle their execution, by batching those schedules with this limit. Each Batch's execution is delayed by the STARTUP_THROTTLING_DELAY factor. |
| STARTUP_THROTTLING_DELAY | If there are more than STARTUP_THROTTLING_LIMIT schedules which need to get run at startup, the schedules are batched and each batch is delayed by this delay. |

TABLE B5

Schedule Properties.

| Name | Default Value | Description |
|---|---|---|
| ID | N/A | Uniquely identifies the schedule in the system |
| GROUP_ID | N/A | Identifies the group, the schedule is part of. |
| START_TIME | 0 (no start time) | Absolute time when the scheduler timeline starts. Schedule guarantees that the associated actions will not be triggered before start time. Start time is optional. |
| RELATIVE_START_TIME | 0 (no relative start time) | The time delay from the schedule creation time at which the schedule could become active. |
| END_TIME | −1 (no end time) | Absolute time when the scheduler timeline ends. Schedule guarantees that the associated actions will not be triggered after end time. End time is optional |
| MAX_RUN_COUNT | −1 (infinite) | Maximum number of times a schedule can fire. |

TABLE B5-continued

Schedule Properties.

| Name | Default Value | Description |
|---|---|---|
| DELETE_WHEN_EXPIRED | FALSE | Specifies if the schedule must be deleted after it expires |
| USES_NETWORKING | FALSE | Specifies if the actions associated with the schedule use networking. This is used for aligning the schedules to conserve battery power. |
| RID | Null | Identifies the radio id, if the actions use networking. |
| EARLY_RUN_TIME | 0 [Aggregation disabled] | Defines the amount of time the schedule run can be advanced from its schedule run. |
| CONDITIONS | NULL | Set of conditions which must be true, for the schedule to be active. |
| ACTIONS | N/A | Set of actions which are triggered for schedule when schedule executes |

Appendix C

Listed below in Table C1 are exemplary properties and definitions involved in defining a recurrent schedule.

TABLE C1

Exemplary Properties for Recurrent Schedule.

| Properties | Definition |
|---|---|
| AbsoluteStartTime | The time in UTC the schedule begins. If absent at schedule creation, the system assigns the "T = 0" starttime, a system time that is in the past, designed to align all schedules to the same start time. The schedule executes at the aligned interval, not to exceed the interval duration. If the application specified an absolute start time that occurs in the past, and the application specifies that IntervalDurationDrift = True, then the behavior is the same as if AbsoluteStartTime was absent (align to the system assigned T = 0). Else the schedules align to the AbsoluteStartTime provided. If the absolute start time is greater than the current time, than the first scheduled time will be the absolute start time. If an absolute start time is provided, it will not be reset after the device loses power. For example, if the application specifies 5 pm UTC as the start time, with a 24 hour duration, the schedule will always attempt to execute at 5 pm UTC daily. All schedules persist across reboot because the schedules are saved into a persistent store. |
| RelativeStartTime | The number of minutes relative to the time of provisioning when the schedule should begin. RelativeStartTime has more meaning for remotely managed operations, where the server doesn't know what time it is on the device (the user may have change the time due to time zone) and the server would like to configure the schedule to start x minutes after the remote command is received by the device. Upon provisioning, the scheduler code dynamically creates or overwrites the AbsoluteStart time if it exists, setting it to the current time plus this value. If both AbsoluteTime and RelativeTime are provided, then the last value received via the remote command is the one the scheduler respects. |

TABLE C1-continued

Exemplary Properties for Recurrent Schedule.

| Properties | Definition |
| --- | --- |
| | The RelativeStartTime is stored as minutes and if queried, the result will be the number of minutes. |
| ScheduleRunCount | This is the number of times the actions are scheduled to execute, not to exceed the end date and time, if the end date is specified. If this field is not present and the end date present, the schedule runs until the end date. If this field is zero, the schedule runs infinitely. |
| ActualRunCount | This is the number of times the scheduler has executed the schedule. |
| AbsoluteEnd | The time in UTC the schedule ends. If absent, the schedule never ends unless there is a RelativeEnd. If both AbsoluteEnd and RelativeEnd are provided, then the last value received from the remote management server is the one the Scheduler respects. |
| RelativeEnd | The number of minutes relative to the time of provisioning the schedule should end. Upon provisioning, the scheduler code dynamically creates or overwrites the AbsoluteEnd time if it exists, setting it to the current time plus this value. If both AbsoluteEnd and RelativeEnd are provided, then the last value received is the one the Scheduler respects. The RelativeEnd is stored as minutes and if queried, the result will be the number of minutes. |
| IntervalDuration | This is the base number of minutes between schedule events. If zero, then the schedule will return an error since the schedule is infinite. |
| LinearBackoff | LinearBackoff is a type of schedule that applications may want to use when it is in retry mode. LinearBackoff takes the IntervalDuration and calculates the time between schedules as: X, 2X, 3X, 4X and ending when the AbsoluteEnd is reached or ScheduleRunCount is reached, whichever occurs first. |
| ExponentialBackoff | ExponentialBackoff is a type of schedule that applications may want to use when it is in retry mode. ExponentialBackoff takes the IntervalDuration and calculates the time between schedule events as: X, 2X, 4X, 8X, 16X, 32X and ending when the AbsoluteEnd is reached or ScheduleRunCount is reached, whichever occurs first. |
| Action | The application can specify an action to execute at the scheduled time. Exemplary actions supported are: launch an EXE or create a named event. A schedule can exist without an action - it would be a schedule to do nothing, which is relevant, for example: when the radio roams, do nothing. |
| RequiresNetwork | This property indicates whether the application needs a network connection for their scheduled actions. |
| DeleteWhenExpired | The application can specify that the schedule is deleted when expired. When set to true, the Schedule is deleted when the ActualRunCount is equal to the ScheduleRunCount. When the schedule end date occurs, there is a possibility that the user or the system has changed the device clock. |
| Condition | A recurrence schedule can be activated based on an occurrence of an event or events. For example: activate this schedule when the device is cradled and desktop pass-through is available. When null, ConditionPriority is not required. Note: the events in the state and notification broker are limitless, applications can create and maintain any types of events that other applications are interested in. |
| ConditionPriority | This tells the Scheduler the order to check conditions that activate a schedule. Multiple conditions can be true at the same time, so this order is necessary. A ConditionPriority is required when a condition has been set. Assigning the same priority to multiple schedules in the same group will result in an error. |
| GroupID | An ID that represents a grouping of the schedules that have conditions that will be checked in the order specified by ConditionPriority. Within the GroupID, each priority assignment must be unique. |
| SpecifyRunEarlyTime | If False, application does not want to specify the RunEarlyTime. Use the number of minutes equal to 10% of the interval duration as the "run early tolerance" in this case. If True, the application wants to specify the RunEarlyTime. |
| RunEarlyTime | If SpecifyRunEarlyTime is True, this value is the percentage of the IntervalDuration that the application is willing to be executed earlier than scheduled, in order to help the device preserve battery by piggybacking on an available connection. |
| IntervalDurationDrift | If False, the IntervalDuration is an average value. This means if the scheduled time executes early due to aggregation, the next scheduled time is not adjusted to ensure that the IntervalDuration is X. For example, a service has a schedule to run every 1 hr, the scheduled time is noon and 1 pm. At 11:55 pm, there is an existing data connection and the service has a RunEarlyTime that allows it to be scheduled early, to piggy-back on the 11:55 pm connection event. The next scheduled time remains at 1 pm. If True, the IntervalDuration is the maximum amount of time between scheduled events. This means that the next scheduled time is equal to the last scheduled time + the IntervalDuration. |

What is claimed is:

1. One or more computer storage media having computer-executable components for conserving power for a mobile device, said components comprising:
    an interface component for receiving notification of availability of a power-consuming resource on the mobile device;
    a condition component for identifying a plurality of schedules stored in a memory area that consume the power-consuming resource during execution, each of said plurality of schedules having a recurrent activation time and a tolerance factor;
    an aggregation component for selecting one or more of the identified plurality of schedules for which a difference between the recurrent activation time and a time of receipt of the notification by the interface component is within the tolerance factor;
    a conservation component for executing the schedules selected by the aggregation component to use the power-consuming resource; and
    a throttle component for limiting a quantity of schedules executed by the conservation component as a function of a predefined limit value.

2. The one or more computer storage media of claim 1, wherein the power-consuming resource comprises one or more of the following associated with a mobile device: a radio frequency transmitter, a backlight, a processor, an audio amplifier, a global positioning system, a digital memory ready, a short-range wireless network adapter, an auxiliary processor, a vibration motor, a ringer, a camera, an accelerometer, and an ambient light sensor.

3. A method comprising:
- receiving an event notification, said received event notification indicating that a resource associated with a computing device is available;
- accessing a plurality of recurrent schedules, each of said plurality of recurrent schedules having a defined activation time and a tolerance factor associated therewith;
- identifying one or more of the accessed schedules as a function of the received event notification, a current time, the defined activation time, and the tolerance factor of each of the accessed schedules;
- limiting, as a function of a throttle limit, a quantity of the identified schedules to be activated; and
- activating the limited quantity of the identified schedules to consume the available resource,
- wherein identifying the one or more of the accessed schedules comprises identifying one or more of the accessed schedules for which a difference between the current time and the defined activation time is within the tolerance factor.

4. The method of claim 3, wherein activating the identified schedules comprising executing one or more actions associated with the identified schedules.

5. The method of claim 3, wherein each of the plurality of schedules has an interval duration between activation times, and further comprising defining a next activation time for each of the activated schedules based on the interval duration for the schedule.

6. The method of claim 5, wherein defining the next activation time comprises adding the interval duration for each of the schedules to the current time to define the next activation time for each of the schedules.

7. The method of claim 5, wherein a difference between the current time and the defined next activation time is less than the interval duration.

8. The method of claim 3, wherein identifying the one or more of the accessed schedules comprises:
- calculating the difference between the current time and the defined activation time for each of the schedules;
- comparing the calculated difference to the tolerance factor for the schedules; and
- identifying one or more of the schedules based on said comparing.

9. The method of claim 3, wherein identifying the one or more of the accessed schedules comprises identifying one or more of the schedules that use the available resource.

10. The method of claim 3, wherein said receiving, said accessing, said identifying, and said activating are performed by a mobile device.

11. The method of claim 3, wherein each of the plurality of schedules has at least one action associated therewith, and wherein activating the identified schedules comprises instructing a mobile device to perform the action associated with each of the identified schedules.

12. The method of claim 3, further comprising defining the throttling limit, and wherein activating the limited quantity of the identified schedules comprises activating a quantity of the identified schedules that is less than the defined throttling limit.

13. The method of claim 12, wherein the identified schedules activate on a mobile device, and wherein defining the throttling limit comprises defining the throttling limit as a function of a consumption state of the resource on the mobile device.

14. A system comprising:
- a memory area for storing a plurality of recurrent schedules, each of said plurality of recurrent schedules having a defined activation time, a tolerance factor, and an interval duration between activation times; and
- a processor configured to execute computer-executable instructions for:
- receiving the defined activation time, tolerance factor, and interval duration for each of the recurrent schedules;
- storing the received activation time, tolerance factor, and interval duration in the memory area;
- receiving notification of an event at a notification time, said received notification indicating that a resource associated with a computing device is available;
- identifying one or more of the recurrent schedules to which the received notification applies and for which a difference between the defined activation time and the notification time is within the tolerance factor;
- limiting, as a function of a predefined limit value, a quantity of the identified schedules to be activated;
- aggregating the limited quantity of the identified schedules for activation; and
- executing one or more actions associated with each of the aggregated schedules to consume the available resource.

15. The system of claim 14, wherein the event comprises a boot of a mobile device, and wherein the processor is further configured to align the activation of the identified schedules to a common activation time.

16. The system of claim 14, wherein the memory area and the processor are associated with a mobile device.

17. The system of claim 14, wherein the memory area and the processor are associated with a device management server, and wherein the processor is configured to execute the one or more actions by instructing a mobile device to perform the execution of the actions associated with each of the aggregated schedules.

18. The system of claim 14, further comprising:
- means for identifying one or more of the plurality of recurrent schedules as a function of the received notification, the notification time, the defined activation time, and the tolerance factor of each of the plurality of schedules; and
- means for aggregating the identified schedules for activation.

19. The system of claim 14, further comprising means for aligning activation of the recurrent schedules.

* * * * *